United States Patent [19]

Condolios

[11] 4,260,488
[45] Apr. 7, 1981

[54] DEVICE FOR COMPACTING AND DRAINING FLUID SLUDGES CONTAINING FIBROUS MATERIALS

[75] Inventor: Elie Condolios, Grenoble, France

[73] Assignee: Societe Generale de Constructions Electriques et Mecaniques Alsthom S.A., Paris, France

[21] Appl. No.: 713,607

[22] Filed: Aug. 11, 1976

[30] Foreign Application Priority Data

Aug. 19, 1975 [FR] France .............................. 75 25687
Jun. 11, 1976 [FR] France .............................. 76 17755

[51] Int. Cl.³ ............................................. C02F 11/12
[52] U.S. Cl. ................................. 210/259; 210/202; 210/208; 210/512.1; 210/528; 210/533; 100/148
[58] Field of Search .................. 100/147, 148; 210/10, 210/66, 67, 415, 83, 84, 86, 104, 109, 112, 199, 200, 202, 208, 219, 521, 528, 533, 512 R, 259, 294

[56] References Cited

U.S. PATENT DOCUMENTS

| | | | |
|---|---|---|---|
| 1,604,650 | 10/1926 | Manning | 210/66 |
| 1,772,262 | 8/1930 | Naugle | 210/415 |
| 3,065,689 | 11/1962 | Gueytron | 100/148 |
| 3,111,082 | 11/1963 | Larsson et al. | 100/147 |
| 3,322,283 | 5/1967 | Babunovic et al. | 210/415 |
| 3,695,173 | 10/1972 | Cox | 210/415 |
| 3,777,658 | 12/1973 | Vosskuhler | 210/415 |
| 3,923,652 | 12/1975 | Condolios et al. | 210/67 |

*Primary Examiner*—Peter A. Hruskoci

[57] ABSTRACT

Device for compacting fluid sludges containing fibrous materials, consisting in slowly stirring the sludge mechanically in the top part of a device, then pressing it moderately in a conical intermediate part of the device and then compacting it in a bottom cylindrical chamber of the device.

12 Claims, 6 Drawing Figures

DEVICE FOR COMPACTING AND DRAINING FLUID SLUDGES CONTAINING FIBROUS MATERIALS

FIELD OF THE INVENTION

The present invention relates to a method of treating sludge.

BACKGROUND

Water purification plants clarify water for redistribution in the public supply, and in so doing they obtain fluid sludge containing mineral substances and vegetable or organic fibres. Similar sludge is obtained in the paper making industry and in other industries.

These types of sludge are generally not very concentrated and according to the mineral substances and the type of fibres contained, the concentration of the sludge is generally very small, i.e. a few grams per liter, so their handling is difficult.

Sludge in this state cannot be handled by conventional means of transport: trucks, conveyor belts, etc. It must be disposed in sewage tanks for settling to concentrate them. Then after a more or less long period of time they can finally be drained.

In some cases industries and urban water purifying installations use methods for accelerating the final draining of the sludge. These conventional methods, such as draining on filters or centrifugation, generally require a large investment and entail high operational costs.

Before describing the method which is the subject of this patent application, it would be useful to mention a few general details on the expression "sludge" as used in this specification: it refers to sludge containing dry materials formed by finely divided mineral materials and by fibres in more or less equal parts.

When the concentration of the dry substances is less than 1 g/l, the terms "dirty" or "charged" water or liquor are used.

When the concentration exceeds a few grams per liter, the term "fluid decantation sludge" is used; at a few tens of grams per liter, the sludge is pasty. When the concentration of solid substances reaches 250 to 300 g/l, a solid mass is obtained.

The present invention is directed to an improvement to the sludge compacting device disclosed in U.S. Pat. No. 3,923,652.

The main features described in this patent application are reviewed herebelow.

When it is required to decant fine dry mineral or organic substances rapidly, it is advantageous to insert in the charged liquid small quantities of materials, such as, mineral salts, organic or synthetic floculation agents, so as to concentrate the dispersed dry substances in the form of agglomerations, much larger than the unitary substances so as to speed up decanting.

By forming these flakes, a primary floculation phenomenon is started and small, thin flakes which are not very dense and not very solid are formed. If suitable floculation substances are again added, a second floculation, called the secondary floculation, is obtained with larger and more solid flakes.

After having effected the primary and secondary floculation described hereinabove, the invention described in the said patent consists in a controlled stirring of the sludge in a tank having a shape suitable for ensuring sludge settling. The water or the liquid obtained during the settling being removed into the top part of the device, the clods of settled sludge are removed by suitable means at the bottom of the device.

This controlled stirring of the sludge is effected by slow mechanical stirring throughout the sludge using judiciously-inclined perforated blades in the tank containing the sludge to cause a mechanical primary clumping of the flakes. The liquid extracted from the flakes rises to the top of the device, whereas the clumped flakes are driven to the bottom.

The clumped flakes coming from the top part to the bottom of the tank are driven by a conical screw having one or several blades rotating slowly in a conical recess narrowing downwardly and constituting the sludge output orifice.

This disposition enables the completion of the settling effect started in the top part of the device. Indeed, due to the shape of the screw, the discharge of the sludge decreases the nearer the extraction orifice of the device is approached so as to send back upwards the interstitial liquid which is still between the flakes and to make the latter come out in a compact mass through the extraction orifice.

Such an arrangement operates well in industry as described in the patent, but proves to be too effective for mineral substances carrying fibrous substances.

Indeed, such sludges forms flakes which, due to tangling of the fibres in the flakes, become very solid in the top stage of the device. These flakes are then made so compact by the extraction screw that the extraction discharge decreases too rapidly and the dry substance becomes solid and in some cases it is not possible to extract it from the bottom of the device.

SUMMARY OF THE INVENTION

The present invention is concerned with an improvement in the device for extracting compact and hardened sludge leaving such a device and consists firstly in having an extraction screw in the conical part of the tank with a shape constituted by one or several blades having a large pitch, perforated or otherwise, for effecting a moderate settling of the flakes and secondly in bringing the flakes thus moderately settled into a bottom cylindrical chamber where they are made more compact by a mechanical means including means for the lateral discharge of the liquid, this same mechanical means, for example a screw, discharging the said compacted flakes through an orifice having an automatically adjustable cross-section as a function of their compacting density.

Thus, compacting in three phases is effected, firstly stirring in the top of the device to increase the volume of the flakes and to harden them, then a moderate compression of the flakes in the conical part of the device, a part of the interstitial water being sent back upwards and lastly final compacting in a cylindrical chamber with lateral discharge of the remaining interstitial water.

BRIEF DESCRIPTION OF THE DRAWING

Embodiments for implementing the method according to the invention, having no limiting character, are described hereinbelow by way of example with reference to the accompanying drawings in which.

DETAILED DESCRIPTION

Figure 1:
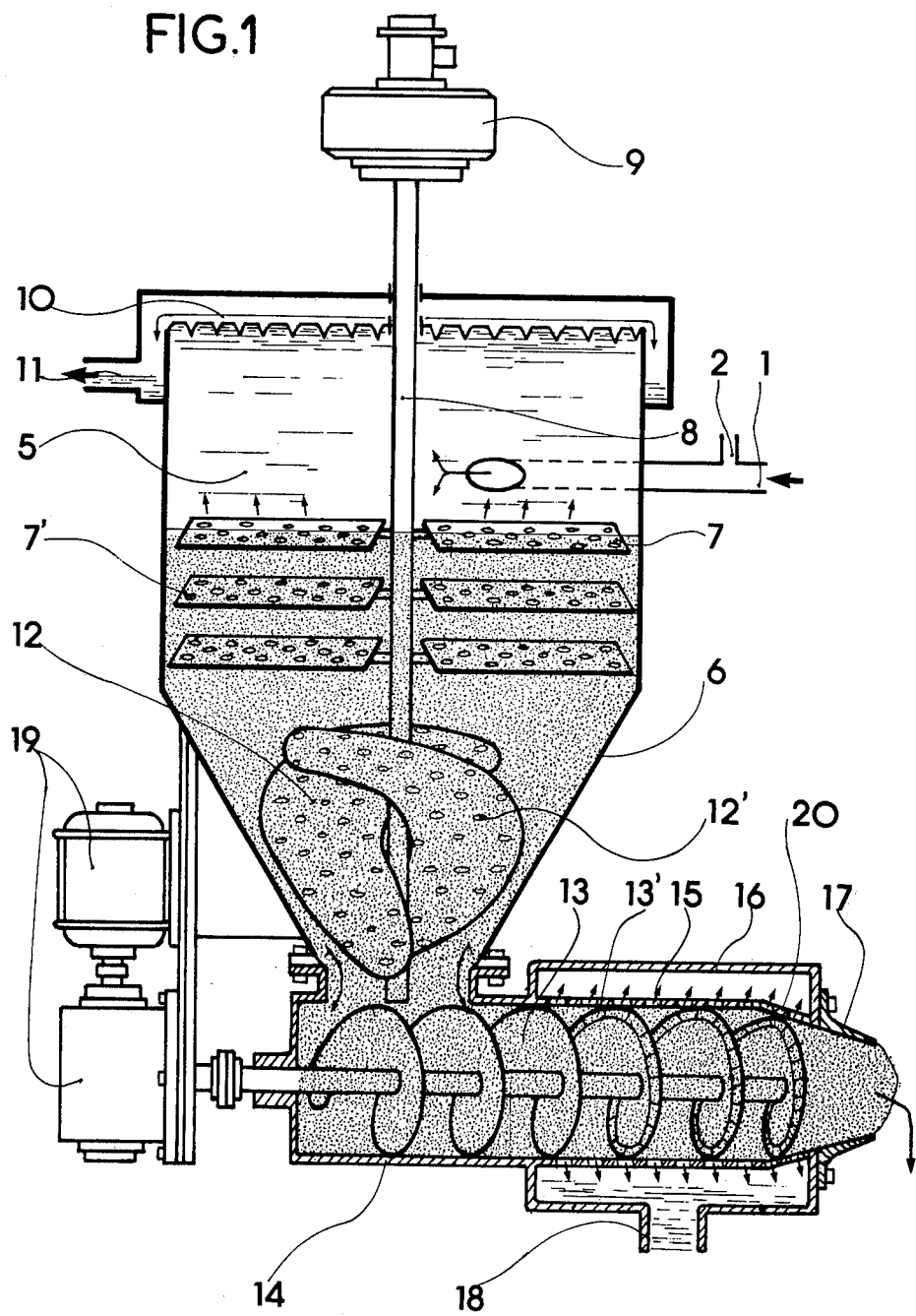
FIG. 1 is an axial cross-sectional view of a compacting device.

The sludge resulting from primary and secondary floculation and decanting using, for example, the method described in the background are brought tangentially into the device by a pipe 1, at mid height of a tank 5.

It is necessary to inject organic floculation substances through inlet 2 placed on the pipe 1 so as to start floculation in the cylindrical part of tank 5 of the device.

The large flakes formed are then deposited in the bottom of the tank and the liquid or the water which is drawn from the flakes rises towards a spillway 10 of the tank 5 and is poured regularly through the V-shaped notches placed on the spillway 10 to be removed by a recuperation spout 11.

The flakes which were deposited on the bottom of the tank are then stirred by one or several stages of blades 7 turning slowly in the tank.

The blades are controlled by a shaft 8 and a motor-reduction gear 9 making it possible to obtain the required speed.

One of the important points of the invention is that it is necessary: to mull the flakes at a slow speed so as not to break them; the maximum speed, at the fastest point of the blades, must not exceed ten or so centimeters per second.

The blades must have a certain width, be more or less inclined according to the type of flakes and the length of the fibres contained in the sludge so as to cause slow, small amplitude movements of the sludge.

Under the effect of the mechanical pressure of the blades on the flakes and of the movements of the sludge, there is observed a winding of the primary flakes which harden a reduction in the distance between the flakes and a grouping together of the primary flakes which become tangled together. All these actions are accompanied by an extrusion of the liquid or of the clear water which rises towards the top of the tank 5 and by an increase in the concentration of the dry substances in the sludge.

The blades 7 are generally provided with holes 7' having suitable dimensions. The presence of these holes improves, with some fibrous sludge, the extrusion of the liquid or of the water contained in the flakes.

The device can comprise one or several blades per stage, the number being non-limiting.

The device can comprise at least one stage, but sometimes, several stages are necessary for perfecting the required effect.

In the case of fibrous sludge, it is already concentrated in volume when it reaches a conical part 6 at the bottom of the tank 5.

A conical compression screw 12 is constituted in this case by one or several blades having a large pitch to avoid too rapid settling of the flakes which could cause the blocking of the system. The several blades of screw 12, are provided with perforations $12^1$.

This conical screw 12 shown in FIG. 1 by a twin blade system which takes up the sludge settled by the top blades, compresses them slightly and increases their concentration and pushes them through a lower orifice at the bottom of the conical part 6 into a final compacting chamber 14.

This final compacting chamber 14 having a cylindrical shape is itself provided with a worm screw 13 of the Archimedean screw type which rotates at a slow speed.

The sludge containing the fibrous and mineral substances is then composed of large hardened flakes still containing interstitial liquid which it is necessary to remove to obtain substances in a solid form at the output of the extraction screw.

The Archimedean screw 13 controlled by a motor reduction gear unit 19 pushes the sludge, which begins to solidify, towards the orifice.

The compacting chamber 14 comprises, near its downstream part a drain grating 15 having a suitable shape. This drain grating can be constituted by slots having small dimensions, of the order of a millimeter, smooth towards the inside or formed by shells open towards the outside. The shapes of the gratings used are to be adapted to the type of fibrous substances and to the average length of the fibres.

The drain grating ends in a conical part 20 having a smaller diameter than that of the chamber 14.

Under the effect of the screw 13, the sludge pushed into the grating drives out its interstitial water and is concentrated at its arrival in the conical part 20 of the grating. The mass flow propelled by the screw decreases as the water is removed and the screw mechanically pushes the fibres and other solid substances towards the outlet and compresses them which has the effect of pushing back the water which leaves through the grating 15.

The compacted solid substances which have become hard are pushed into a conical orifice 17 formed by a flexible and deformable substance e.g. India rubber having a greater thickness at its base and a lesser thickness towards its final outlet.

This orifice 17 is the regulating orifice of the extraction system, which regulation would otherwise require the use of more complex means in other systems.

Indeed, in an industrial installation, the quantity of dry substances entering the device is variable and it is necessary to regulate the speed of the Archimedean screw 13 to obtain normal operation as well as the dimension of the orifice 17, assuming orifice 17 were, for example, metallic.

Such speed regulation would require measurement of the torque on the shaft of the screw and also of the length of the plug formed by the compact solid substances formed upstream from the orifice 17; these two measurements would enable remote control of the opening or the closing of the orifice 17 and the speed of the Archimedean screw 13.

By means of the flexible orifice 17 placed at the end of the chamber 14, all these measurements and adjustments are no longer necessary, self-adjustment being effected directly by the flexible diaphragm 17.

Indeed, when the solid discharge of dry substances increases, the length of the plug compressed at the end of the chamber 14 increases and the torque of the shaft of the screw 13 increases. The solid discharge pushed by the screw 13 increases. If the cross-section of the orifice 17 is constant, the screw compresses the plug even more and it becomes blocked in the orifice.

With the flexible orifice, the screw compresses the plug which opens the cross-section of the orifice so as to obtain a balance between the solid extraction discharge and the solid discharge entering the screw.

When the solid discharge decreases to become zero, the length of the plug is equal to the distance comprised between the end of the screw 13 and the output opening of the orifice 17; the torque on the screw is zero and the screw 13 no longer pushes the plug which blocks the end of the chamber 14 and maintains the hydrostatic level in the tank 5 at the height of the spillway 10.

The grating 15 of the chamber 14 is surrounded by a chamber or a spout 16 which collects the water or the liquid leaving through the grating.

This water charged with sludge and fibres is collected at the bottom of an orifice 18 then brought upwards by suitable means to be mixed with the charged liquid to be purified entering the pipe 1. The Archimedean screw 13 bears, on its periphery, in its part in contact with the grating 15, flexible elements 13' which rub against the grating and which enable the permanent automatic cleaning thereof and avoid possible clogging by the fibres.

During normal operation, the maximum discharge rate of solids which can be extracted through the flexible orifice 17 is arranged to be greater than the maximum flow rate of solids which can be inserted through the pipe 1.

In all cases of operation, the level of precompacted sludge in the tank 5 is situated below the level of the top blades 7.

Fluid sludge charged with long fibrous materials such as cotton fibres, wool fibres, asbestos fibres, etc., produces large flakes and the tangling thereof forms a network such that a rotation of the fibres with the mechanical pressing screw is observed, this rotation causing an appreciable reduction in the advancing speed of the fibres and hence of the solid extraction discharge of this screw and being able to cause a complete blocking of this screw as well as breakage of the drive system.

Figure 2:
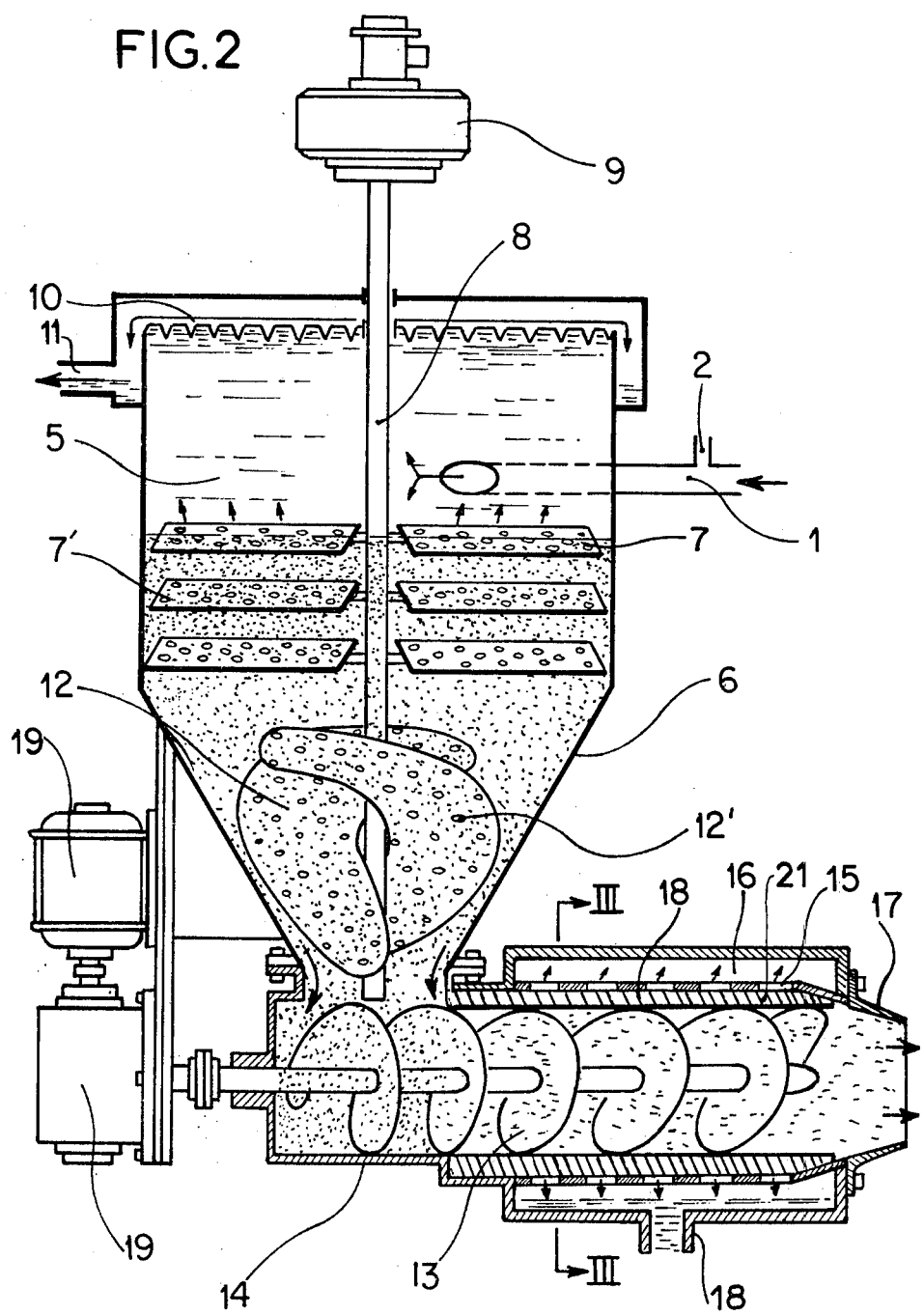
FIG. 2 is an axial cross-sectional view of the device in FIG. 1 modified by the variant of a grating shown in FIG. 1.
Figure 3:
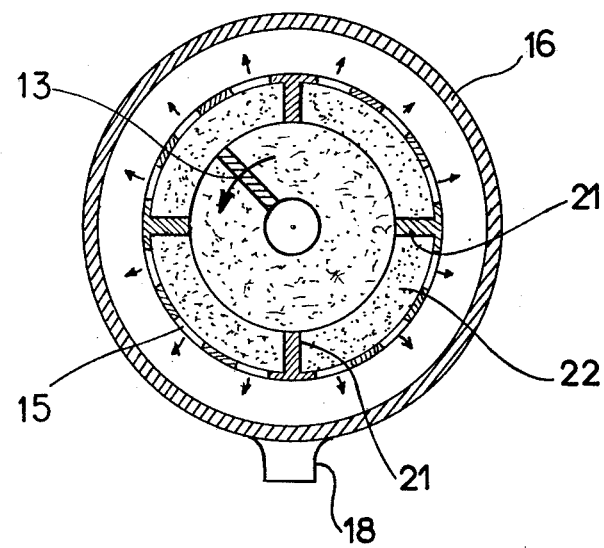
FIG. 3 is a cross-sectional view taken along the line III—III in FIG. 2.

The variant in FIGS. 2 and 3 is intended to avoid this disadvantage and consists in providing the inside of the wall of the draining grating with four fixed blades 21 parallel to the axis of the screw 13.

Figure 4:
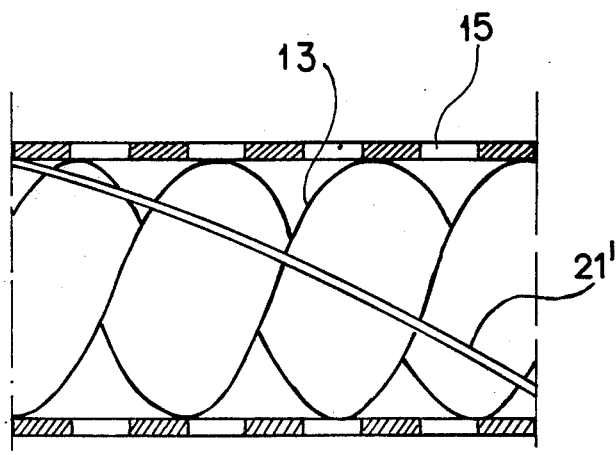
FIG. 4 is a diagrammatic view of a variant of FIG. 2.

According to a variant shown in FIG. 4, the fixed blades 21 spiral round the chamber 14 at such a pitch that the axis of the blades 21 crosses the axis of the end of the screw 13 at an angle of almost 90°.

It will be seen in FIG. 3 that in the cavities 22 formed between the fixed blades, the grating 15 and the screw 13, there is some fibrous sludge which is not affected by the direct mechanical action of the screw 13.

If the sludge to be compacted comprises long fibres and short fibres, it happens that the short fibres accumulate slowly on the wall of the grating 15, progressively causing the obstruction thereof and reducing the quality of the draining.

Figure 5:
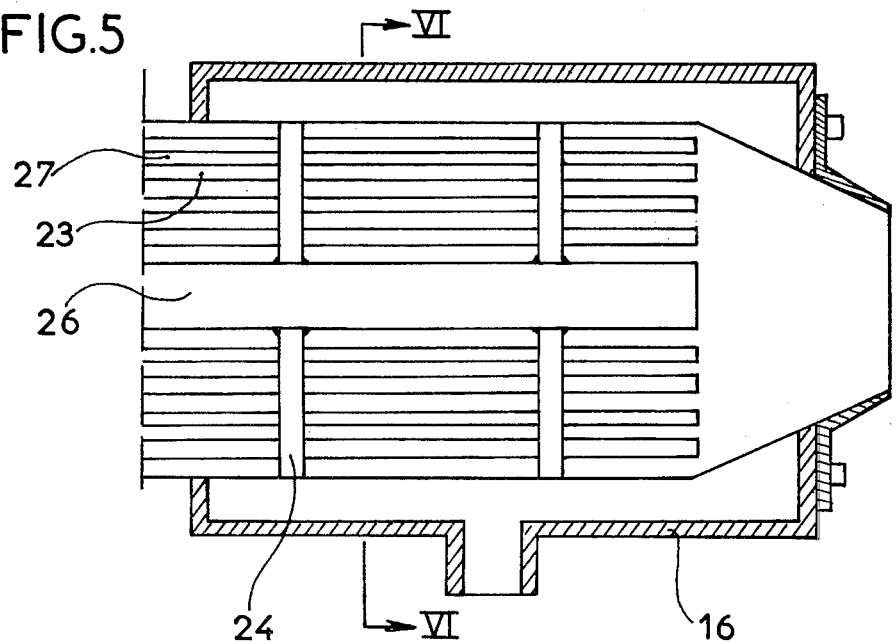
FIG. 5 is an elevational view of a variant of a compacting grating.
Figure 6:
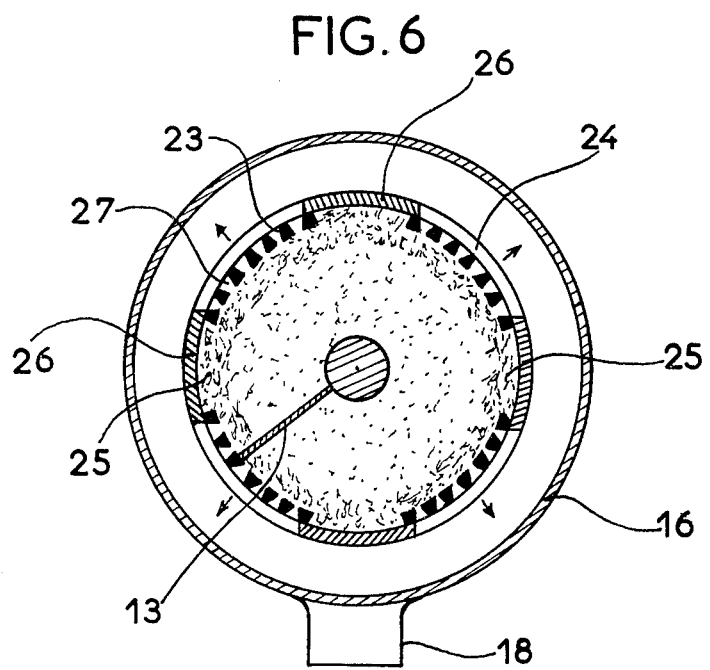
FIG. 6 is a cross-sectional view taken along line VI—VI in FIG. 5.

To overcome this disadvantage, a particular disposition of the drain grating such as shown in FIGS. 5 and 6 is provided.

FIG. 6 shows that the grating is formed by bars 23 having a trapezoidal cross-section.

The greatest width of the bars is towards the inside of the chamber 14.

The bars of the grating are parallel to the pressing screw 13. The spacing between the bars is between a few tens of millimeters and a few millimeters.

The grating bar assembly is held by circular reinforcing parts 24.

Longitudinal cavities 25 closed by strips 26 prevent the rotation of the settled fibres.

The screw 13 pushes the compacted fibrous sludges in the longitudinal direction of the screw and this sludge is blocked in rotation by the fibres which are in the cavities 25. The liquid extruded from the pressed fibrous flakes leaves through the slots 27 of the grating.

What we claim is:

1. A device for compacting or settling aqueous sludge containing finely divided mineral and fibrous substances of organic or mineral origin after previous treatment by primary and secondary floculation of the sludge in its original liquid support, said apparatus comprising a vertical vessel including an upper cylindrical portion and a lower conical portion, a supply pipe for the sludge to be treated extending tangentially at a level below the top of the cylindrical portion of said vessel, a plurality of rotating perforated blades having a vertical axis installed in said cylindrical portion below said supply pipe, a conical rotating screw having a vertical axis installed in the conical portion of said vessel, said conical screw comprising means including at least one blade having a pitch correlated to the fibrous sludge to be treated so that compressed sludge at this level is not solidified and still contains interstitial water, said conical portion having a lower end with an outlet orifice thereat for compressed sludge, a spillway at the upper end of the cylindrical portion of said vessel for the discharge of a part of the interstitial water contained in the sludge, a horizontal cylindrical chamber secured to said conical portion of said vessel at the outlet orifice, said chamber including a downstream portion having a wall constituted as a grating for the discharge of remaining interstitial water contained in the sludge, a rotating screw installed in said chamber and extending beneath said outlet orifice, said chamber having an outlet orifice at an end thereof for discharge of compacted sludge, and flexible outlet means at said orifice having a conical shape and a free end with an outlet diameter which is smaller than its inlet diameter.

2. A device according to claim 1, wherein the conical screw has perforations.

3. A device according to claim 1, wherein the grating of said cylindrical chamber has a cylindrical shape.

4. A device according to claim 1, wherein said flexible outlet means has a varying thickness and is thicker near its base and thinner near its outlet.

5. A device according to claim 1, wherein the grating of the cylindrical chamber is of wire gauze type.

6. A device according to claim 1, wherein the grating of the cylindrical chamber has slots.

7. A device according to claim 6, wherein the slots are in the shape of shells opening outwards.

8. A device according to claim 1 comprising fixed blades disposed on the inside wall of the grating.

9. A device according to claim 8, wherein the fixed blades are parallel to the axis of the pressing rotating screw in the cylindrical chamber.

10. A device according to claim 8, wherein the fixed blades wind inside the cylindrical chamber at a predetermined pitch.

11. A device according to claim 1, wherein the grating is constituted by bars having a trapezoidal cross-section, the largest width of the bars being inside the chamber, these bars being parallel to the screw in the chamber and longitudinal alveoli closed by strips being formed between certain bars.

12. A device according to claim 1, wherein the grating of said cylindrical chamber has a cylindrical portion and a terminal conical portion.

* * * * *